US 9,459,861 B1

United States Patent
Rogers et al.

(10) Patent No.: US 9,459,861 B1
(45) Date of Patent: Oct. 4, 2016

(54) SYSTEMS AND METHODS FOR DETECTING COPIED COMPUTER CODE USING FINGERPRINTS

(71) Applicant: Terbium Labs, Inc., Baltimore, MD (US)

(72) Inventors: Daniel J. Rogers, Baltimore, MD (US); Michael Moore, Columbia, MD (US); Dionysus Blazakis, Parkville, MD (US)

(73) Assignee: TERBIUM LABS, INC., Baltimore, MD (US)

( * ) Notice: Subject to any disclaimer, the term of this patent is extended or adjusted under 35 U.S.C. 154(b) by 0 days.

(21) Appl. No.: 15/079,719

(22) Filed: Mar. 24, 2016

Related U.S. Application Data

(60) Provisional application No. 62/138,543, filed on Mar. 26, 2015.

(51) Int. Cl.
G06F 7/04 (2006.01)
G06F 9/44 (2006.01)

(52) U.S. Cl.
CPC ..................... G06F 8/751 (2013.01)

(58) Field of Classification Search
CPC ....................................... G06F 8/751
USPC ............................................. 726/32
See application file for complete search history.

(56) References Cited

U.S. PATENT DOCUMENTS

| | | |
|---|---|---|
| 5,559,884 A | 9/1996 | Davidson et al. |
| 6,000,030 A | 12/1999 | Steinberg et al. |
| 6,108,420 A | 8/2000 | Larose et al. |
| 6,381,739 B1 | 4/2002 | Breternitz, Jr. et al. |
| 6,591,415 B1 | 7/2003 | Torrubia-Saez |
| 6,668,325 B1 | 12/2003 | Collberg et al. |
| 7,424,131 B2 | 9/2008 | Alattar et al. |
| 7,581,092 B2 | 8/2009 | Shear et al. |
| 7,590,853 B1 | 9/2009 | Shear et al. |
| 7,685,590 B2 | 3/2010 | Venkatesan et al. |
| 7,734,553 B2 | 6/2010 | Shear et al. |
| 7,761,916 B2 | 7/2010 | Shear et al. |
| 7,770,016 B2 | 8/2010 | Horne et al. |
| 7,904,707 B2 | 3/2011 | Shear et al. |
| 7,925,898 B2 | 4/2011 | Shear et al. |
| 8,056,138 B2 | 11/2011 | Jin et al. |

(Continued)

FOREIGN PATENT DOCUMENTS

CN 102012862 4/2011

OTHER PUBLICATIONS

Arruda, P., et al., "A Framework for Detecting Code Piracy Using Class Structure"; Proceedings 22nd International Conference on Software Engineering & Knowledge Engineering (SEKE); (Jul. 2010); pp. 559-564.

(Continued)

*Primary Examiner* — Peter Shaw
(74) *Attorney, Agent, or Firm* — Patent Portfolio Builders PLLC

(57) ABSTRACT

Systems and methods of detecting copying of computer code or portions of computer code involve generating unique fingerprints from compiled computer binaries. The unique fingerprints are simplified representations of functions in the compiled computer binaries and are compared with each other to identify similarities between functions in the respective compiled computer binaries. Copying can be detected when there are sufficient similarities between fingerprints of two functions.

15 Claims, 13 Drawing Sheets

(56) References Cited

U.S. PATENT DOCUMENTS

| | | | |
|---|---|---|---|
| 8,140,850 | B2 | 3/2012 | Horne et al. |
| 8,214,497 | B2 | 7/2012 | Alperovitch et al. |
| 8,365,277 | B2 | 1/2013 | Kim et al. |
| 8,370,634 | B2 | 2/2013 | Horne et al. |
| 8,495,755 | B2 | 7/2013 | Jin et al. |
| 8,533,848 | B2 | 9/2013 | Jin et al. |
| 8,533,851 | B2 | 9/2013 | Ginter et al. |
| 8,566,960 | B2 | 10/2013 | Richardson |
| 8,661,559 | B2 | 2/2014 | Wilson et al. |
| 8,997,256 | B1 | 3/2015 | Rogers et al. |
| 9,218,466 | B2 | 12/2015 | Rogers et al. |
| 2004/0143713 | A1* | 7/2004 | Niles .................. G06F 11/1453 711/162 |
| 2005/0028002 | A1 | 2/2005 | Christodorescu et al. |
| 2006/0230453 | A1 | 10/2006 | Flynn et al. |
| 2007/0074287 | A1 | 3/2007 | Abad |
| 2007/0239993 | A1 | 10/2007 | Sokolsky et al. |
| 2008/0222414 | A1* | 9/2008 | Wang .................. H04L 9/0643 713/161 |
| 2008/0288653 | A1 | 11/2008 | Adams |
| 2009/0172404 | A1 | 7/2009 | Kim et al. |
| 2009/0328185 | A1 | 12/2009 | Berg et al. |
| 2010/0011441 | A1 | 1/2010 | Christodorescu et al. |
| 2011/0214188 | A1 | 9/2011 | Collberg et al. |
| 2011/0246968 | A1 | 10/2011 | Zhang et al. |
| 2012/0254830 | A1 | 10/2012 | Conrad et al. |
| 2012/0317421 | A1 | 12/2012 | Gounares |
| 2013/0036129 | A1 | 2/2013 | Havel et al. |
| 2013/0166600 | A1 | 6/2013 | Snyder, II et al. |
| 2013/0311496 | A1* | 11/2013 | Fedorenko ................ G06F 8/71 707/758 |
| 2014/0068768 | A1 | 3/2014 | Lospinuso et al. |
| 2014/0090067 | A1 | 3/2014 | Tripp |
| 2014/0223565 | A1 | 8/2014 | Cohen |
| 2015/0180883 | A1 | 6/2015 | Aktas et al. |
| 2015/0186648 | A1 | 7/2015 | Lakhotia |

OTHER PUBLICATIONS

Bilar, D., "Callgraph properties of executables"; AI Communications 20.4; (Dec. 2007); pp. 231-243.

Bruschi, D., et al., "Using Code Normalization for Fighting Self-Mutating Malware"; Proceedings of the International Symposium on Secure Software Engineering; (Mar. 2006); pp. 1-8.

Cesare, S., et al.;,"Classification of Malware Using Structured Control Flow"; Proceedings of the Eighth Australasian Symposium on Parallel and Distributed Computing; vol. 107; Australian Computer Society, Inc. (Jan. 2010); pp. 51-70.

Collberg, C., et al., "Software Watermarking: Models and Dynamic Embeddings"; Proceedings of the 26th ACM SIGPLAN-SIGACT Symposium on Principles of Programming Languages, ACM; (Jan. 1999); pp. 311-324.

Commission on the Theft of American Intellectual Property, "The IP Commission Report: The Report of the Theft of American Intellectual Property"; (May 2013); 100 pages.

Dullien, T., et al., "Graph-based comparison of Executable Objects (English Version)"; SSTIC 5 (Jun. 2005); pp. 1-3.

Flake, H., "Structural comparison of executable objects"; In Flegel, U., and Michael Maier (eds.). "Detection of Intrusions and Malware & Vulnerability Assessment: GI Special Interest SIDAR Workshop"; DIMVA; (Jul. 2004); pp. 161-173.

Lim, H. et al., "A method for detecting the theft of Java programs through analysis of the control flow information"; Information and Software Technology 51.9 (Sep. 2009); pp. 1338-1350.

Mandiant.com, "APT1: Exposing One of China's Cyber Espionage Units"; (Feb. 19, 2013); 76 pages.

McAfee Labs and McAfee Foundstone Professional Services, "Protecting Your Critical Assets: Lessons Learned from Operation Aurora" (2010); pp. 1-15.

Rajaraman, A. et al., "Mining of Massive Datasets"; Cambridge University Press, Dec. 30, 2011; 453 pages.

Robles-Kelly, A., et al., "Graph-Edit Distance from Spectral Seriation"; IEEE Transactions on Pattern Analysis and Machine Intelligence, 27.3 (Mar. 2005); pp. 365-378.

Verizon,"Verizon 2012 Data Breach Investigations Report;" (Mar. 2012); 80 pages.

Zaremski, A. M., "Signature and Specification Matching"; Diss. Massachusetts Institute of Technology; (Jan. 1996); 150 pages.

Jiaming, F. et al., "Comparison of Executable Objects Based on Singatures and Properties," Journal of Computer Research and Development; (Jun. 2009); pp. 1868-1876, vol. 46, Issue 11, China Academic Journal Electronic Publishing House.

Xie, X. et al., "A Static Software Birthmark Based on Use-Define Chains for Detecting the Theft of Java Programs," Security and Cryptography; Zhengzhou Information Science and Technology Institute; (Jul. 2011); pp. 231-237; Henan, China.

Carrera, et al., "Digital Genome Mapping—Advanced Binary Malware Analysis"; Virus Bulletin Conference; :Sep. 2004); pp. 1-11.

Page, L., "The PageRank Citation Ranking: Bringing Order to the Web"; Stanford Info Lab, Technical Report; (Jan. 29, 1998); pp. 1-17.

Needleman, S. B. et al., "A General Method Applicable to the Search for Similarities in the Amino Acid Sequence of Two Proteins"; Department of Biochemistry, Northwestern University and Nuclear Medicine Service, V.A. Research Hospital; J. Mol. Biol., vol. 48; (Jul. 21, 1969); pp. 443-453; Chicago, IL.

International Search Report and Written Opinion of the International Searching Authority in related International Application No. PCT/US15/22650 mailed Jul. 7, 2015.

Myers, G. et al., "Detecting Software Theft via Whole Program Path Birthmarks", Information Security, Springer-Verlag Berlin Heidelberg, Sep. 2004, pp. 404-415.

International Search Report mailed Aug. 8, 2016 in related International Application No. PCT/US2016/023940.

Written Opinion mailed Aug. 8, 2016 in related International Application No. PCT/US2016/023940.

\* cited by examiner

|   | 6 | 5 | 4 | 3 | 2 | 1 |
|---|---|---|---|---|---|---|
| 6 | 1 |   |   |   |   |   |
| 5 |   |   |   |   |   |   |
| 4 | 1 |   | 1 | 1 | 1 | 0 |
| 3 | 1 | 1 | 1 | 2 | 1 | 0 |
| 2 | 1 | 1 | 1 | 1 | 1 | 1 |
| 1 | 0 | 0 | 0 | 1 | 0 | 0 |

Fig. 11A

|   | 6 | 5 | 4 | 3 | 2 | 1 |
|---|---|---|---|---|---|---|
| 6 | 1 |   |   |   |   | 0 |
| 5 |   |   |   |   |   |   |
| 4 | 1 |   | 3 | 1 | 1 | 0 |
| 3 | 1 | 1 | 1 | 2 | 1 | 0 |
| 2 | 1 | 1 | 1 | 1 | 1 | 1 |
| 1 | 0 | 0 | 0 | 1 | 0 | 0 |

Fig. 11B

|   | 6 | 5 | 4 | 3 | 2 | 1 |
|---|---|---|---|---|---|---|
| 6 | 4 | 3 | 2 | 1 | 1 | 0 |
| 5 | 3 | 3 | 2 | 1 | 1 | 0 |
| 4 | 3 | 2 | 3 | 1 | 1 | 0 |
| 3 | 1 | 1 | 1 | 2 | 1 | 0 |
| 2 | 1 | 1 | 1 | 1 | 1 | 1 |
| 1 | 0 | 0 | 0 | 1 | 0 | 0 |

Fig. 11C

SYSTEMS AND METHODS FOR DETECTING COPIED COMPUTER CODE USING FINGERPRINTS

CROSS REFERENCE TO RELATED APPLICATIONS

This application claims the benefit of Provisional Application 62/138,543, filed Mar. 26, 2015, the entire disclosure of which is herein expressly incorporated by reference. This application is related to Provisional Application 61/973,125, filed Mar. 31, 2014, U.S. Non-Provisional application Ser. No. 14/314,307, filed Jun. 25, 2014, and U.S. Non-Provisional application Ser. No. 14/621,554, filed Feb. 13, 2015, the entire disclosures of which are herein expressly incorporated by reference.

BACKGROUND OF THE INVENTION

Software theft has been, and continues to be, pervasive. Individuals and companies typically try various techniques to combat software theft, including requiring a unique software key to install software, requiring online activation of software, requiring an active online connection to use software, encryption of software, and the like. Although these techniques typically prevent casual users from installing unauthorized copies, the techniques can typically be overcome by sophisticated users.

Another way to combat software theft is to try to identify the source of the stolen software using watermarks. This involves applying unique watermarks to each copy of the software so that when a stolen piece of software is found, the watermark in the stolen software will corresponding to one of the unique watermarks in the authorized software. This requires modification of the computer code, which is undesirable. Further, this technique can be overcome by removing the watermark from the stolen software or removing the watermark from the authorized software so that all further copies do not contain the unique watermark.

SUMMARY OF THE INVENTION

In addition to the issues identified above with the known techniques for combating software theft, these techniques focus on the software as a whole, and thus cannot identify when only portions of the underlying code are stolen. For example, if a watermark were applied to the software, the watermark would not appear in the stolen software if less than the entire code were used. Similarly, if software theft were identified by comparing hash values generated from the authorized and stolen software, the hash values would not match when less than the entire underlying code is present in the stolen software. Thus, a thief could simply modify some portion of the code to defeat these techniques. Further, it is often the case that only a portion of the underlying code is truly unique and provides the overall value to the software, and accordingly a thief may only want to use this unique portion in different software. For example, a thief could copy one or several functions from someone else's software and incorporate the function(s) in his/her own software. Because these functions may comprise only a small part of the overall code in the thief's software, simple watermarking and hash value techniques across an entire set of code would not identify this theft of several functions from someone else's code.

Exemplary embodiments of the present invention are directed to techniques for combating software theft by identifying whether at least a portion of one piece of software appears in another piece of software. Thus, the present invention allows the identification of whether portions of one piece of software appear in a different piece of software, even when the overall operation of the two pieces of software is different. The inventive technique is particularly useful because it operates using compiled computer binaries, and thus does not require access to the underlying source code.

In accordance with exemplary embodiments of the present invention, fingerprints are generated for functions in compiled computer binaries. The fingerprint generation involves generating a block rank score for each block of a function and then generating order list of blocks in a path through the function using the block rank scores. The comparison of fingerprints involves the use of the ordered list of blocks for each corresponding function to identify similarities between the fingerprints.

BRIEF DESCRIPTION OF THE DRAWINGS

FIGS. 11A-11C are block diagrams illustrating exemplary arrays used for calculating fingerprint similarity scores in accordance with the present invention.

DETAILED DESCRIPTION OF THE DRAWINGS

Figure 1:
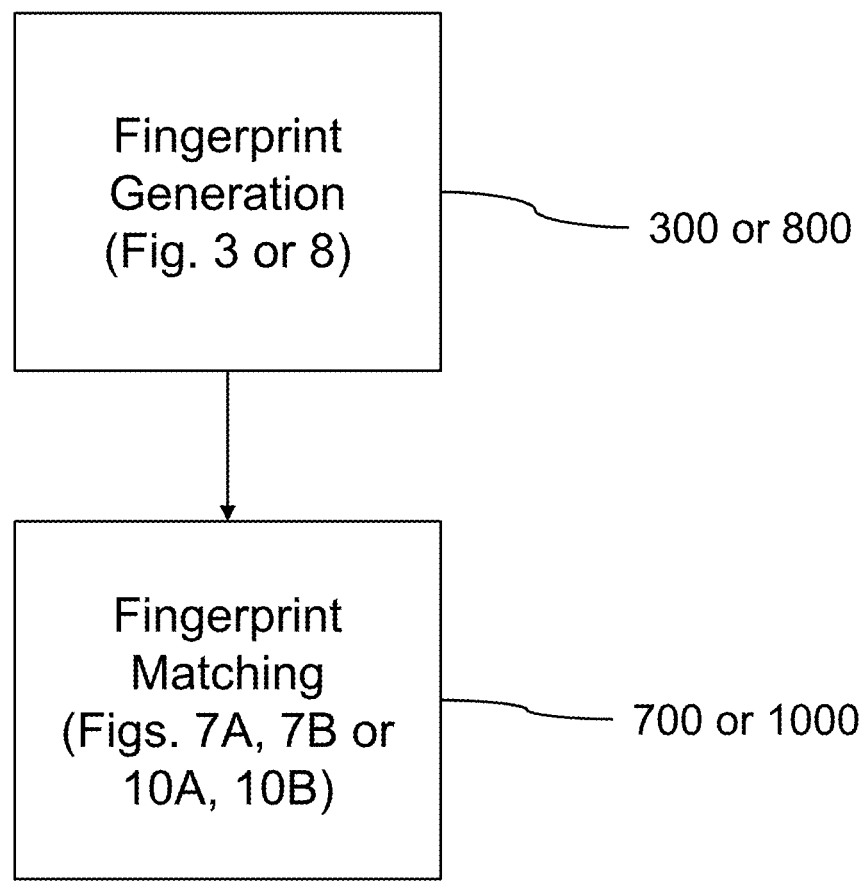
FIG. 1 is a flow diagram of the overall process of exemplary embodiments of the present invention.

FIG. 1 is a flow diagram of the overall process of exemplary embodiments of the present invention. As illustrated in FIG. 1, the overall process involves generating a fingerprint from compiled computer binaries (step 300 or 800) and matching the generated fingerprints to determine whether there is sufficient similarity (step 700 or 1000). It should be recognized that fingerprint generation from compiled computer binaries that are later compared for matching can be performed at approximately the same time or can be performed at different times. For example, a fingerprint of a first compiled computer binary can be generated for purposes of identifying theft of the underlying code. Other compiled computer binaries can then be collected over a period of time, and then fingerprints can be generated using the other compiled computer binaries for comparison with the first compiled computer binaries. These other compiled computer binaries can be obtained in any manner, such as, for example, using a web spider that crawls across the Internet and collects compiled computer binaries. The other compiled computer binaries can also be manually input. For example, the owner of a first compiled computer binary may suspect that a second compiled computer binary contains code stolen from the first compiled computer binary. In this case, the fingerprints can be generated from the first and second compiled computer binaries at approximately the same time and then compared using the inventive fingerprint matching technique.

Figure 2:
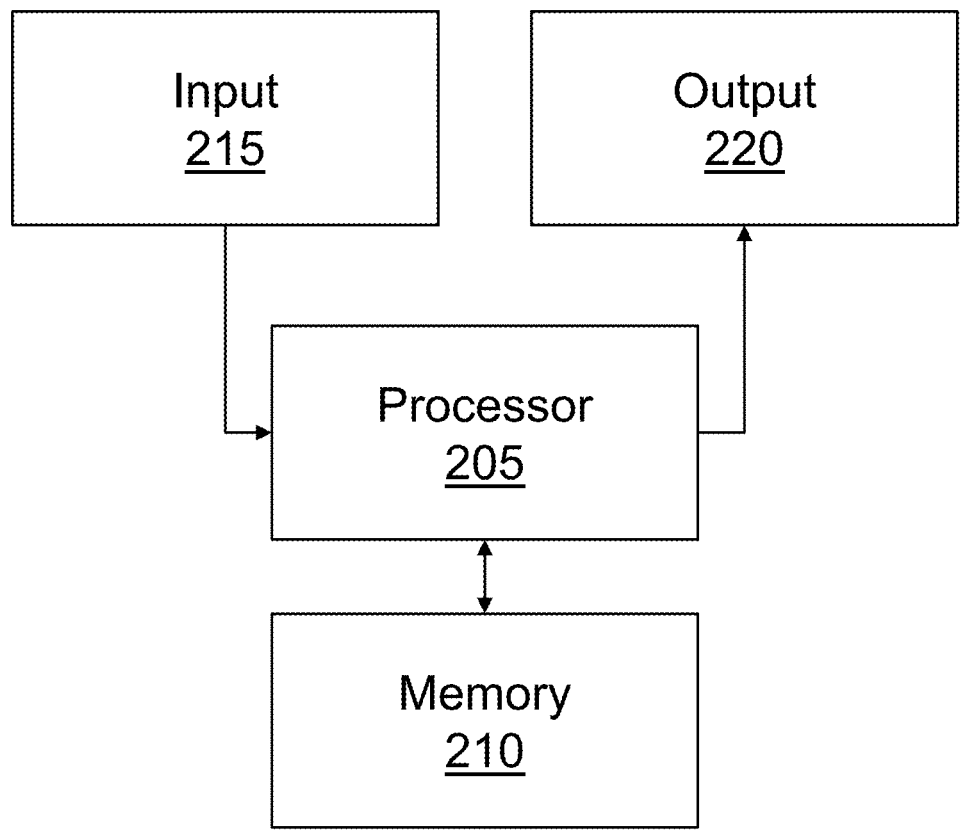
FIG. 2 is a block diagram of an exemplary system for generating and matching fingerprints in accordance with the present invention.

FIG. 2 is a block diagram of an exemplary system for generating and matching fingerprints in accordance with the present invention. The system 200 can comprise one or more computers that include a processor 205 coupled to memory 210, input 215, and output 220. The disclosed processes can be performed by processor 205 executing computer code stored in memory 210. Processor 205 can be any type of processor, including a microprocessor, field programmable gate array (FPGA), and/or an application specific integrated circuit (ASIC). Memory 210 can be any type of non-transitory memory. In addition to storing computer code for executing the processes described herein, memory 210 can also store the generated fingerprints. Alternatively or additionally, a separate storage medium can store the generated fingerprints. For example, the computer binaries, fingerprints, and comparison scores can be stored in a distributed file system and non-relational, distributed database. Input 215 provides mechanisms for controlling the disclosed processes, including, for example, a keyboard, mouse, trackball, trackpad, touchscreen, etc. Further, input 215 can include a connection to an external storage device for providing compiled computer binaries, such as an external hard drive or flash storage memory, as well as a network connection. Output 220 can include a display, printer, and/or the like. Additionally, output 220 can include a network connection for notifying an owner of a compiled computer binary of any identified potential infringement, such as by electronic mail, posting on a website or webpage, a text message, and/or the like.

Figure 3:
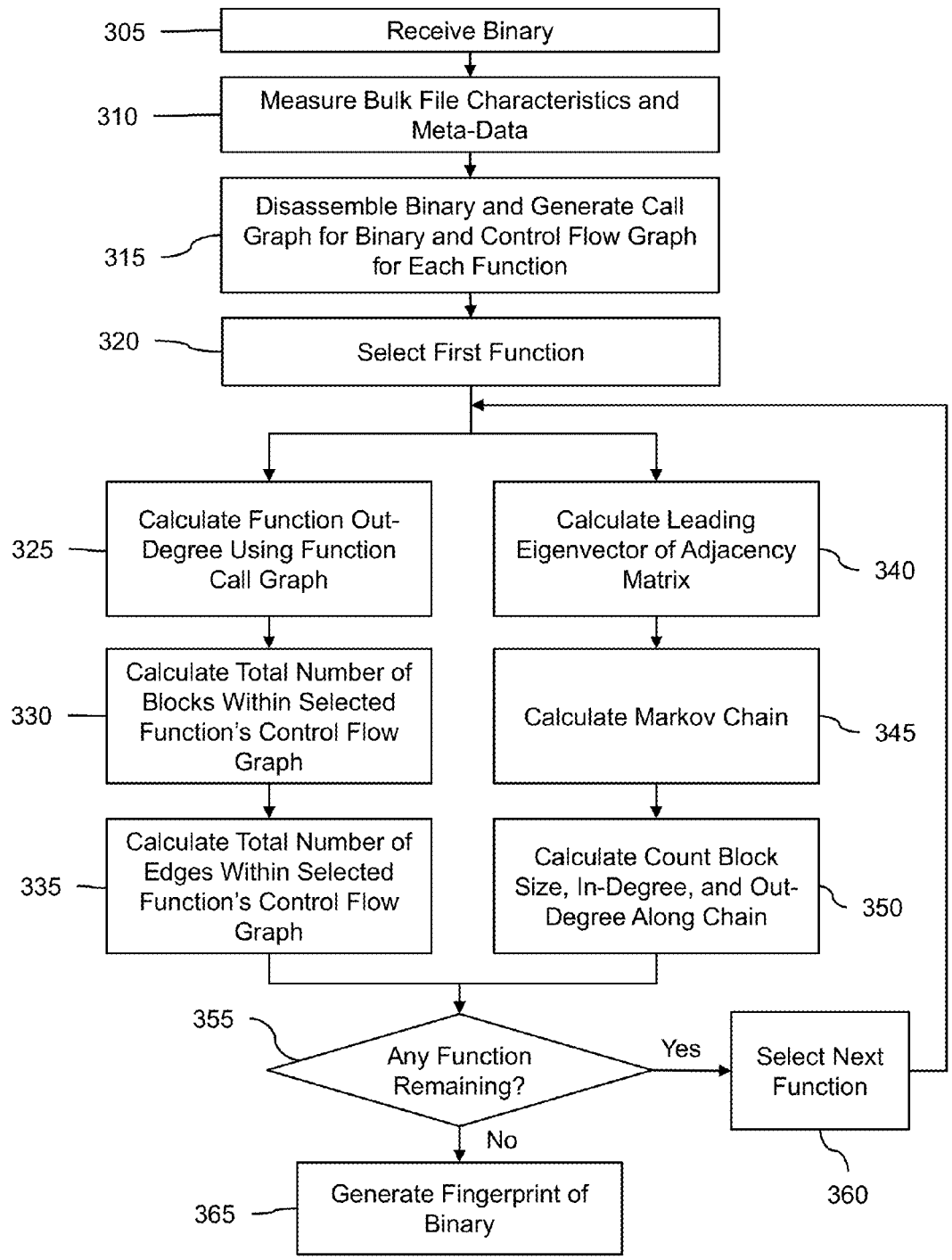
FIG. 3 is a flow diagram of an exemplary process for generating a fingerprint using binary code in accordance with the present invention.

FIG. 3 is a flow diagram of an exemplary process for generating a fingerprint using binary code in accordance with the present invention. This process is performed using the system of FIG. 2. Initially, processor 205 receives a compiled computer binary (step 305) via input 215 and/or memory 210 and measures bulk file characteristics and meta-data (step 310). Next, processor 205 disassembles the compiled computer binary, generates a call graph from the disassembled binary, and generates control flow graphs for each function in the call graph (step 315). Once the compiled computer binary is disassembled, the remainder of the processing can be performed independent of the particular language, operating system, or architecture that the code was written for.

Figure 4:
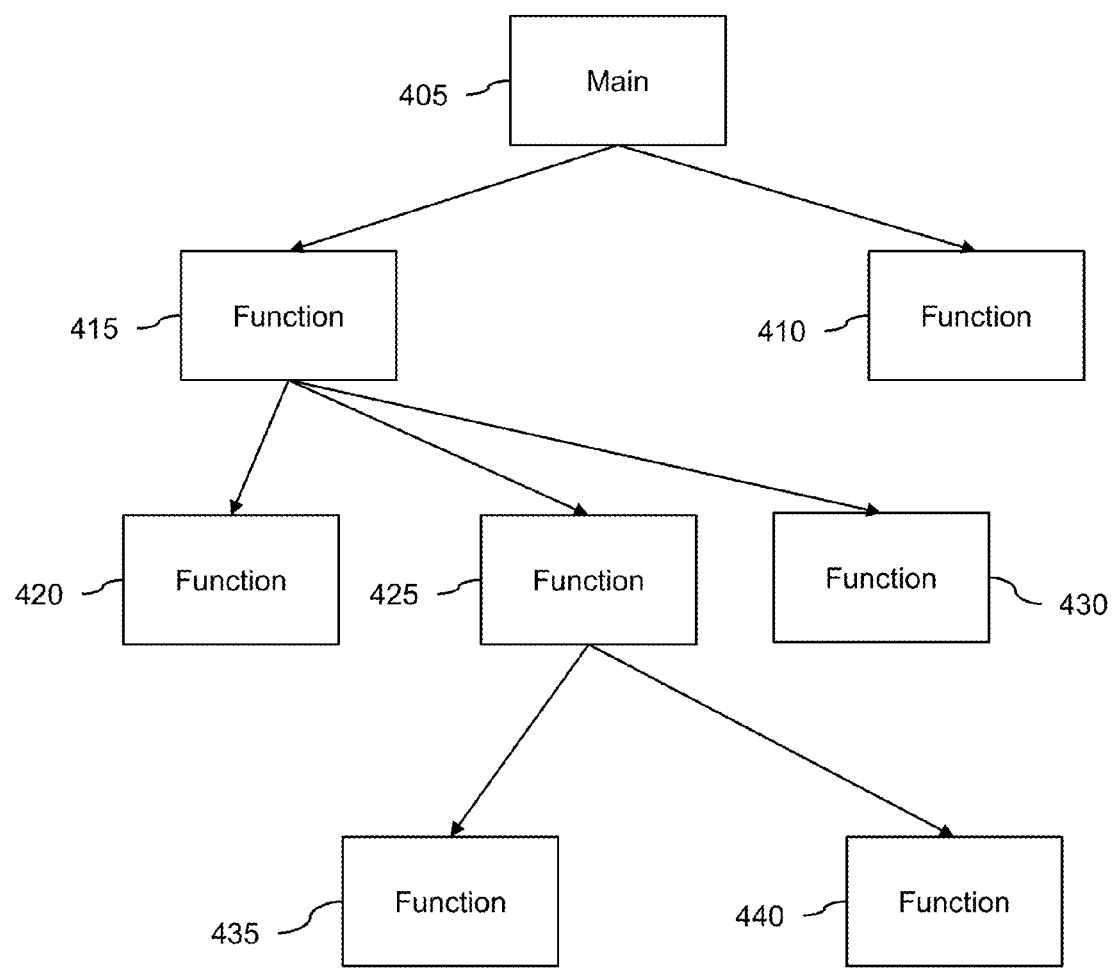
FIG. 4 is a block diagram of an exemplary call graph in accordance with the present invention.

FIG. 4 is a block diagram of an exemplary call graph in accordance with the present invention. As will be appreciated by those skilled in the art, a call graph describes the relationship between various functions in a compiled binary. Thus, in FIG. 4, a main function 405 (also commonly referred to as a routine) has calls to sub-functions 410 and 415 (also commonly referred to as sub-routines). In turn, function 415 has calls to functions 420, 425, and 430, and function 425 has calls to functions 435 and 440. Those skilled in the art will recognize that in a call graph each function is commonly referred to as a node and the connections between functions are commonly referred to as edges. It will be recognized that the call graph of FIG. 4 is a highly simplified graph and that compiled computer binaries typically will be disassembled into much more extensive call graphs.

Figure 5:
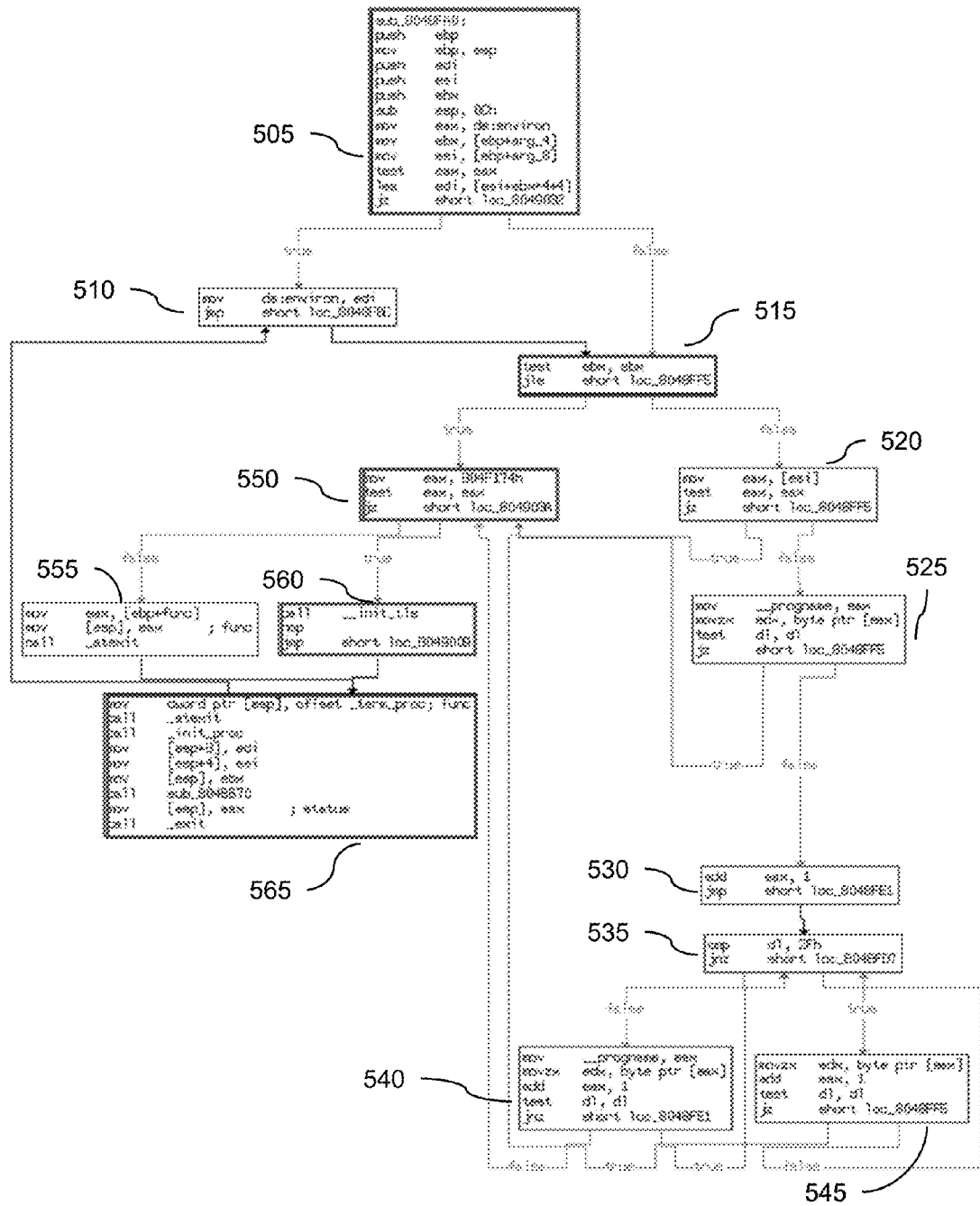
FIG. 5 is a block diagram of an exemplary control flow graph in accordance with the present invention.

FIG. 5 is a block diagram of an exemplary control flow graph in accordance with the present invention. Those skilled in the art will recognize that a control flow graph for a function describes all possible paths that may be traversed during execution of the particular function. Examples of paths that may be executed in the function of FIG. 5 include blocks 505, 515, 520, 525, 530, 535, and 545; 505, 515, 520, 525, 530, 535, 540, 550, 560, and 565; 505, 510, 515, 550, 560, and 565; and 505, 510, 515, 550, 555, and 565. In addition to these paths, any path with connections illustrated in FIG. 5 can be traversed during the execution of the function. Further, it should be recognized that this is merely an exemplary function and that other functions are within the scope of the invention.

Returning to FIG. 3, after processor 205 generates the control flow graphs for each function (step 315), processor 205 selects one of the functions for processing (step 320). As illustrated, this processing is performed along two parallel paths. It should be recognized, however, that these two paths can be performed serially, if desired. It should also be recognized that this parallel processing does not require all of the control flow graphs to be generated, and accordingly this parallel processing can be performed as control flow graphs are generated. Turning to the path on the left-hand side of FIG. 3, first processor 205 calculates the function out-degree using the call graph for the particular function (step 325). The function out-degree represents the number of paths or calls from a particular function to other functions in the call graph. Next processor 205 calculates the total number of blocks within the selected function's control flow graph (step 330), and finally processor 205 calculates the total number of edges within the selected function's control flow graph (step 335). The edges in the control flow graph are the connections between the different blocks within this graph.

Turning now to the path on the right-hand side of FIG. 3, first processor 205 calculates the leading Eigenvector of the adjacency matrix (step 340). The adjacency matrix is comprised of the function coordinates 620 (described below in connection with FIG. 6). Next, processor 205 calculates the Markov chain (step 345). The Markov chain is calculated starting with the leading Eigenvector and then appending connected nodes corresponding with successively smaller elements of the leading Eigenvector. The Markov chain provides a good low-rank approximation, or serialization, of the control flow graph that is relatively unique and particularly well-suited for further statistical analysis of the control flow graph.

Processor 205 then calculates count block size, in-degree, and out-degree along the Markov chain (step 350). These three spectra are relatively unique among and within compiled computer binaries. An example of the count block size, in-degree, and out-degree will now be described in connection with FIG. 5, and assuming a chain between the blocks as follows: 505=>515=>550=>560=>565. In this example the block count spectrum would be [12, 2, 3, 3, 9] because block 505 has 12 instructions, block 515 has two instructions, blocks 550 and 560 each have three instructions, and block 565 has nine instructions. The in-degree spectrum would be [0, 2, 3, 1, 2] because block 505 does not have any incoming edges, block 515 has two incoming edges, block 550 has three incoming edges, block 560 has one incoming edge, and block 565 has two incoming edges. The out-degree spectrum would be [2, 2, 2, 1, 1] because blocks 505, 515, and 550 each have two outgoing edges and blocks 560 and 565 each have two outgoing edges. The values for each spectra and ordering of values provides a unique signature for a particular control flow graph that can be used to identify other functions that have the same or similar unique signatures.

After the processing of the two parallel paths is complete, processor 205 determines whether there are any further functions to process (step 355). If there are ("Yes" path out of decision step 355), then the next function is selected (step 360) and the parallel processing is repeated. If not ("No" path out of decision step 355), then processor 205 generates the fingerprint of the binary using the calculated information (step 365).

Figure 6:
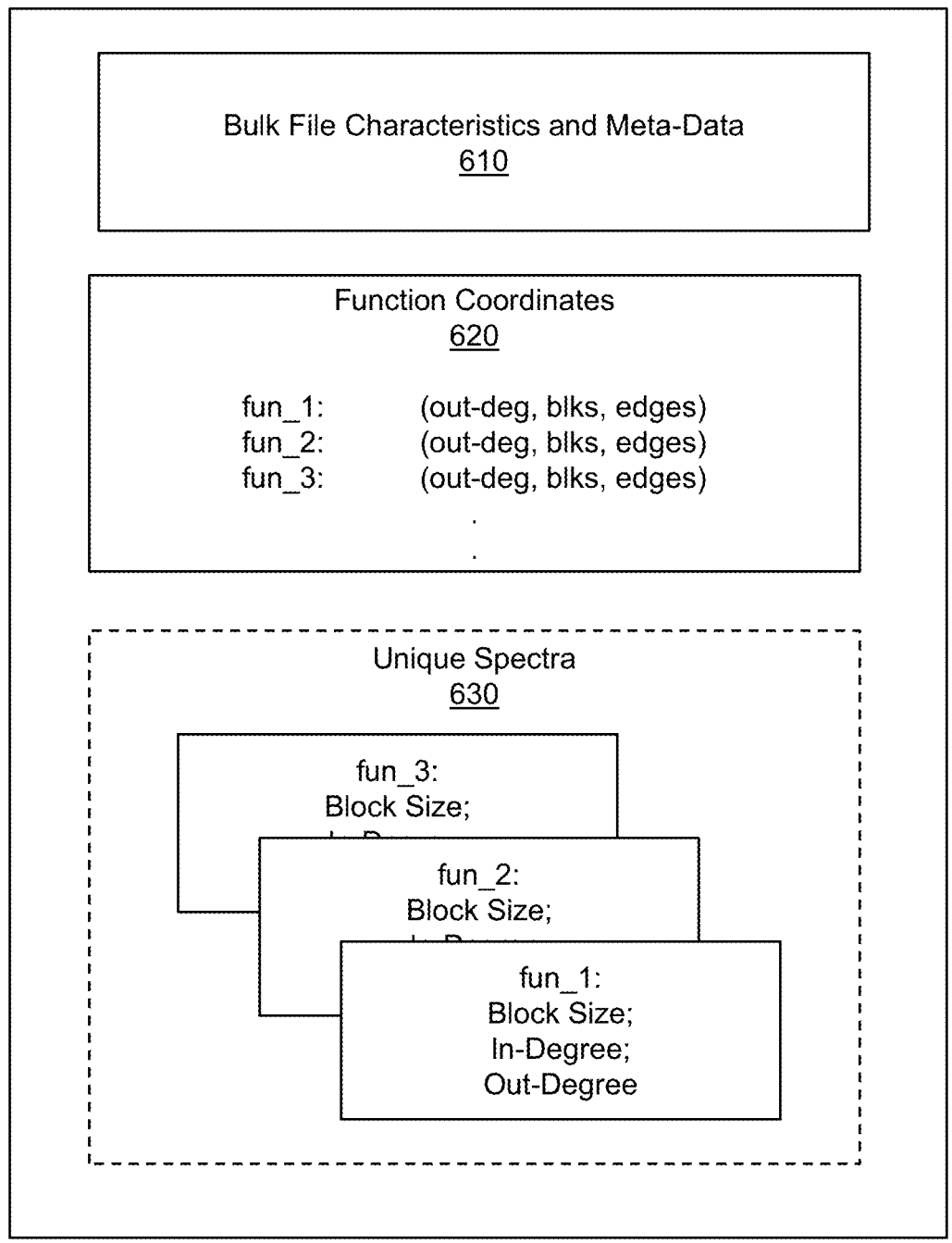
FIG. 6 is a block diagram of an exemplary fingerprint in accordance with the present invention.

FIG. 6 is a block diagram of an exemplary fingerprint in accordance with the present invention. As illustrated in FIG. 6, the fingerprint includes bulk file characteristics and meta-data 610, function coordinates 620, and unique spectra 630. The function coordinates 620 includes, for each function, the calculated out-degree, number of blocks, and number of edges. The unique spectra includes, for each function, the calculated block size, in-degree, and out-degree. These fingerprints are then used for comparison against fingerprints of other compiled computer binaries as described below in connection with FIGS. 7A and 7B.

Figure 7A:
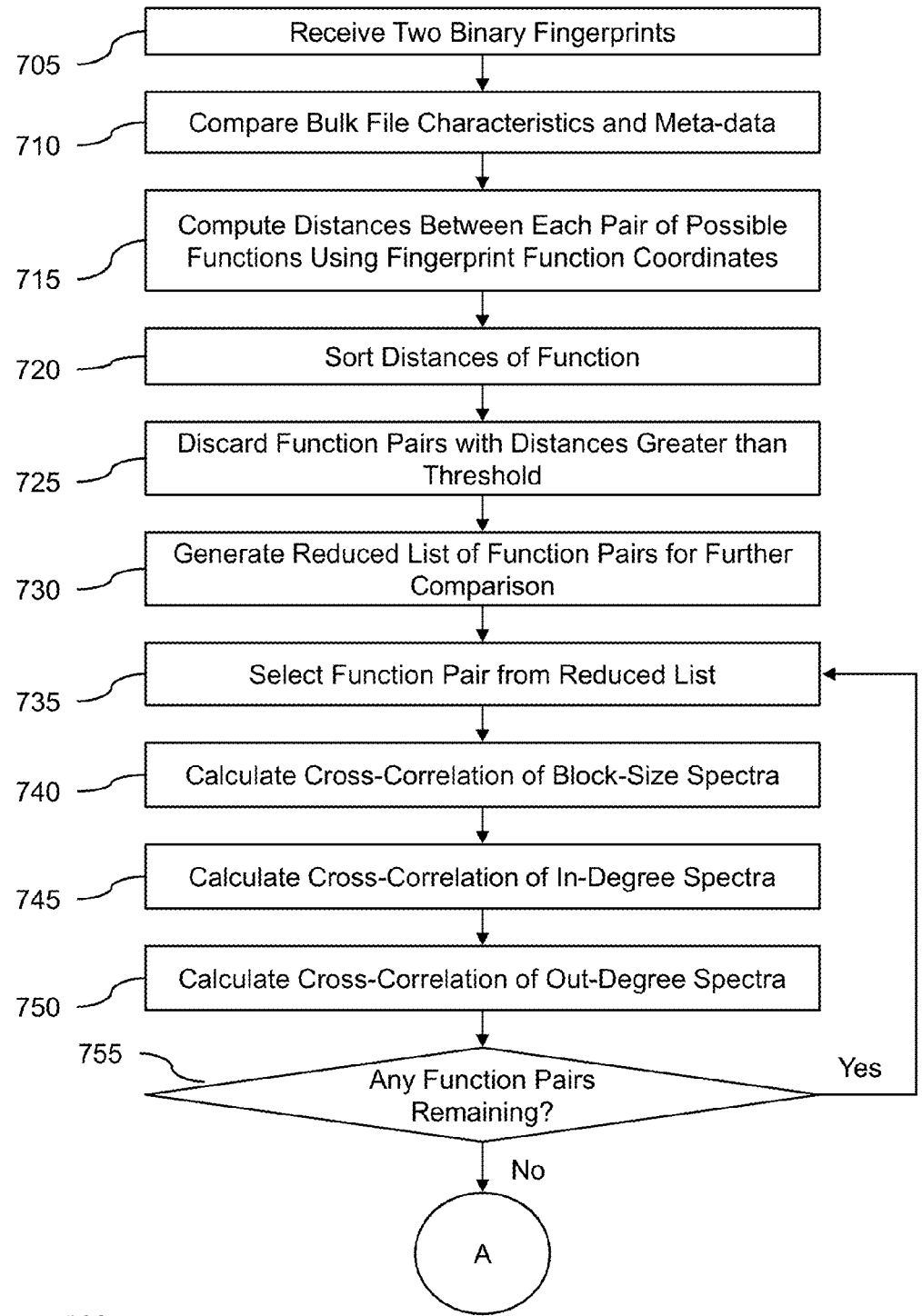
FIGS. 7A and 7B are flow diagrams of an exemplary process for matching fingerprints in accordance with the present invention.
Figure 7B:
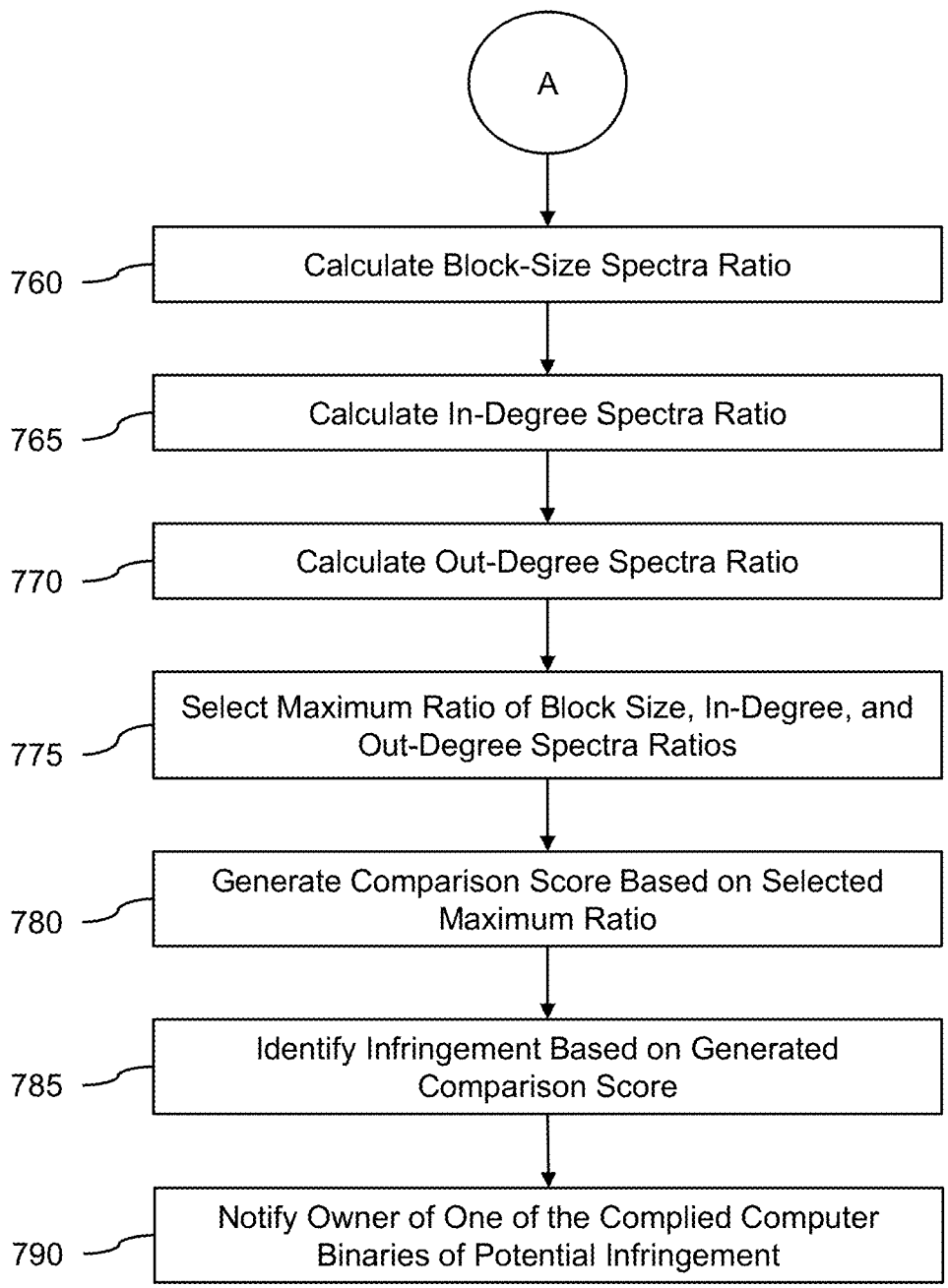

FIGS. 7A and 7B are flow diagrams of an exemplary process for matching fingerprints in accordance with the present invention. This process is performed using the system of FIG. 2. Initially, processor 205 receives two fingerprints of compiled computer binaries via input 215 and/or memory 210 (step 705) and compares their bulk file characteristic and meta-data (step 710). The bulk file characteristic can include measuring the Jaccard Similarity, which is a numerical score representing the amount of overlap between strings contained in both fingerprints, and is typically between 0 and 1.

Next, processor 205 computes distances between each pair of possible functions of the two fingerprints using the function coordinates 620 of the respective fingerprints (step 720). Processor 205 then sorts the distances (step 720) and discards function pairs having distances greater than a threshold distance (step 725). This step reduces the processing load because only the most-likely related functions will have distances below the threshold. Thus, the particular threshold value can be selected depending upon the available processing power of the computer and the desired run-time of the fingerprint comparison process. Furthermore, those skilled in the art will recognize that above a certain distance it is highly unlikely that functions will be related, and thus at least some thresholding should be performed to reduce unnecessary processing.

Processor 205 then generates a list using the remaining function pairs (step 730), and one of the function pairs from the reduced list is selected for further processing of the unique spectra 630 (step 735). Specifically, processor 205 calculates a cross-correlation for the block-size spectra (step 740), the in-degree spectra (step 745), and the out-degree spectra (step 750). It will be recognized that the cross-correlation is a measure of how closely the spectra of the two fingerprints are related. Next processor 205 determines whether any function pairs remain to be processed (step 755). If so ("Yes path out of decision step 755), then the next function pair is selected from the reduced list (step 735) and the cross-correlation of the unique spectra are calculated (steps 740-750). The cross-correlation can produce a correlation coefficient indicating the degree of similarity or correlation. For example, a coefficient of −1 indicates complete anti-correlation and 1 indicates complete correlation (i.e., the two fingerprints have the same control flow graph).

If there are no remaining function pairs to process ("No" path out of decision step 755), then processor 205 calculates a block-size, in-degree and out-degree spectra ratios (step 760-770). These ratios are calculated by dividing a total number of respective correlation coefficients above a threshold by a total number of correlation coefficients. The threshold used for the calculation of the three ratios can be the same or different. Processor 205 then selects the maximum ratio of the unique spectra ratios (step 775) and generates a comparison score based on the selected maximum ratio (step 780). The generated comparison score is then used by processor 205 to identify infringement of one of the compiled computer binaries (step 785). The comparison score is generated by comparing the selected maximum ratio of the unique spectra ratios to a threshold, and accordingly infringement is identified when the selected maximum ratio is above the threshold. The threshold can be set, for example, by training the system using known data and a particular compiled computer binary for which it is to be determined whether there are other compiled computer binaries infringing the particular compiled computer binary. This training identifies commonalities between the known data and the particular compiled computer binary so that the threshold can be set to avoid false positives indicating infringement due to code commonly used across different pieces of software that would not be an indicator of infringement.

When, based on the generated comparison score, there is sufficient similarity between the compiled computer binaries or portions of the compiled computer binaries, processor 205 can notify the owner of one of the compiled computer binaries of the potential infringement via output 220 (step 790). The notification can include details of the regions of the allegedly infringing computer binary that is most likely involved in the infringement.

The collection of compiled computer binaries, fingerprint generation, and fingerprint matching can be automated and scheduled to execute using any type of task scheduling technique. Thus, the present invention provides a particularly cost- and time-effective way to discover, remediate, and enforce intellectual property rights, and accordingly acts as a deterrence against the theft of software code. Further, by identifying infringement based on the functions contained within compiled computer binaries, the present invention can identify an entirely copied compiled computer binary, as well as copied portions of a compiled computer binary.

Figure 8:
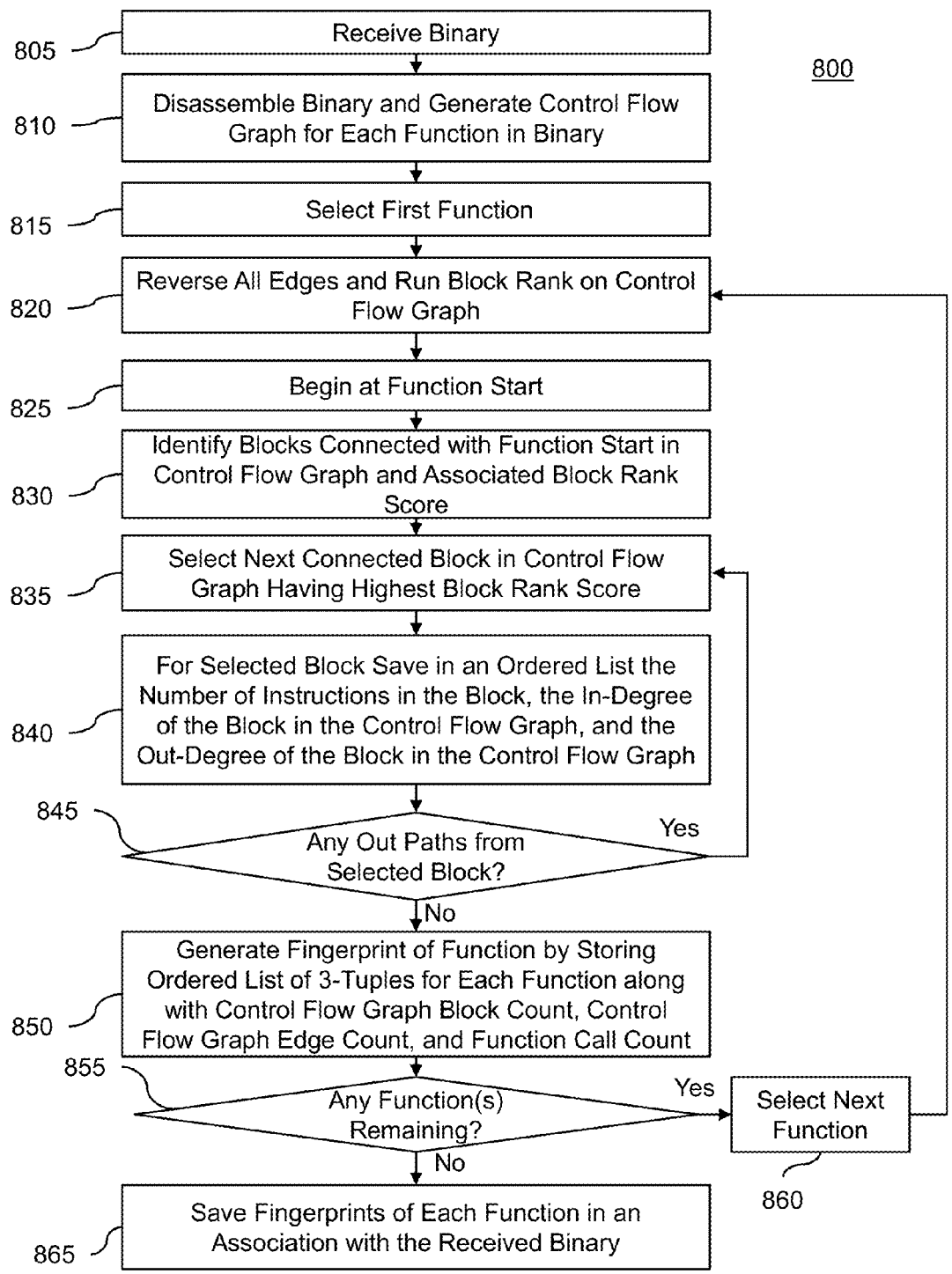
FIG. 8 is a flow diagram of an exemplary fingerprinting technique in accordance with another embodiment of the present invention.

FIG. 8 is a flow diagram of an exemplary fingerprinting technique 800 in accordance with another embodiment of the present invention, which is performed using the system of FIG. 2. Initially, processor 205 receives a binary via input 215 and/or memory 210 (step 805) and disassembles the binary in order to generate a control flow graph for each function in the binary (step 810). Processor 205 selects a control flow graph for a first function (step 815), reverses all of the edges of the selected control flow graph and performs a block rank algorithm on the selected control flow graph in order to generate a block rank score for each block in the control flow graph of the selected function (step 820). The block rank algorithm is similar to the PageRank algorithm disclosed in the article "The PageRank Citation Ranking: Bringing Order to the Web" by L. Page et al. 1999, the entire disclosure of which is herein expressly incorporated by reference. Those skilled in the art will recognize that the PageRank algorithm is a type of Eigenvector centrality algorithm that assigns a value corresponding to the relative importance of each block in a graph. In PageRank the blocks are web pages and the relative importance is based on the number of forward links from the page, as well as the relative importance of the web pages associated with these forward links. In the present invention the blocks within a function and the relative importance of the blocks is based on the number of incoming edges (because the edges are reversed), as well as the relative importance of the blocks from which the incoming edges originate.

Figure 9:
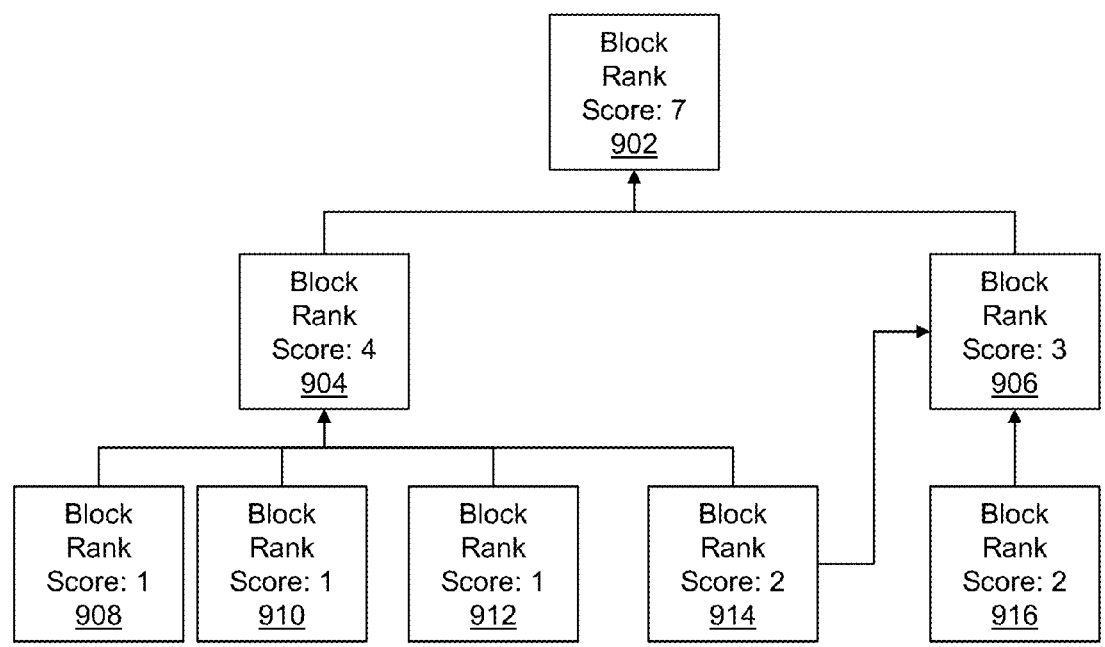
FIG. 9 is a block diagram illustrating application of block ranking to an exemplary function in accordance with the present invention.

The application of block rank scoring to an exemplary, simplified function is illustrated in FIG. 9, which illustrates a function with the edges reversed going from the end of the function to the start. In this exemplary function block 906 has a block rank score of 3 because block 916 has only a single forward path and therefore contributes its entire block rank score of 2 and block 914 has a block rank score of 2, which is divided between blocks 904 and 906. Block 904 has forward links from blocks 908, 910, and 912, each of which have only a single forward path and each having a block rank score of 1, and a forward link from block 914, which splits its block rank score between blocks 904 and 906. Thus, block 904 is assigned a value of 4. Finally, block 902 is assigned a block rank score of 7 because blocks 904 and 906 only have a single forward path, and therefore contribute their entire respective block rank scores of 4 and 3.

Once a relative importance value is assigned to each block within the control flow graph for the first function, a path is constructed starting from the function start based on the block rank score. Specifically, processor 205 begins path construction at the function start (step 825) and identifies the blocks connected to the function start in the control flow graph and the block rank score for each connected block (step 830). Processor 205 then constructs the path to a next block by selecting the one of the identified blocks having a highest block rank score (step 835). When there is more than one of the identified blocks having the same highest block rank score then the block with the larger number of instructions is selected as the next block. If there is still a tie, an arbitrary block is chosen among the blocks having the same highest block rank score.

For each selected block in the path processor 205 saves a 3-tuple in memory 210 as an ordered list based on the order of the blocks in the path (step 840). The 3-tuple comprises the number of instructions in the block, the in-degree of the block, and the out-degree of the block. Next processor 205 determines whether there are any out paths from the selected block (step 845). When processor determines there are out paths ("Yes" path out of decision step 845) then processor 205 uses the block rank score to select a next connected block (step 835).

The path construction continues until a block is reached that does not have any out paths ("No" path out of decision step 845). Once the end block is reached processor 205 generates the fingerprint of the selected function by storing the ordered list of 3-tuples in memory 210 along with the control flow graph block count, the control flow graph edge count, and the function call count (step 850). Each element of the ordered list corresponds to each block along the chosen characteristic path (or the Markov chain referred to above).

Returning to the exemplary function of FIG. 9, the path would be constructed from block 902 to block 904 because block 904 has a higher block rank value than block 906. The path would then continue from block 904 to block 914 because block 914 has the highest block rank value of any of the outgoing paths from block 904. Thus, it should be appreciated that the ordered list does not include all blocks of the function, only those along the path. Accordingly, this reduces the amount of information required to generate a fingerprint, and in turn improves the overall functioning of a computer executing this method because the overall processing power is reduced.

Returning to FIG. 8, next processor 205 determines whether there are any remaining functions in the binary that have not yet been processed (step 855). If processor 205 determines there are any remaining functions ("Yes" path out of decision step 855), processor 205 selects a next function (step 860) and the function is processed in the same manner as the first selected function (steps 820-850). When processor 205 has processed all functions of the binary ("No" path out of decision step 855) the fingerprints of each of the functions are saved in memory 210 along with an association with the received binary from which the functions originated (step 865).

Although FIG. 8 involves fingerprinting functions of a single set of code it should be recognized that this can be performed on additional sets of code so that the fingerprint database is populated with functions from more than one set of code. For example, a software developer could fingerprint all of its code so that the database can later be used to identify copied functions from third-party code. Similarly, an entity can offer a service in which code from one or more software developers is collected, for example, by a web spider as described above, is stored in the database and a software developer can bring its code to the entity to determine whether the database includes any code containing copied functions.

Figure 10A:
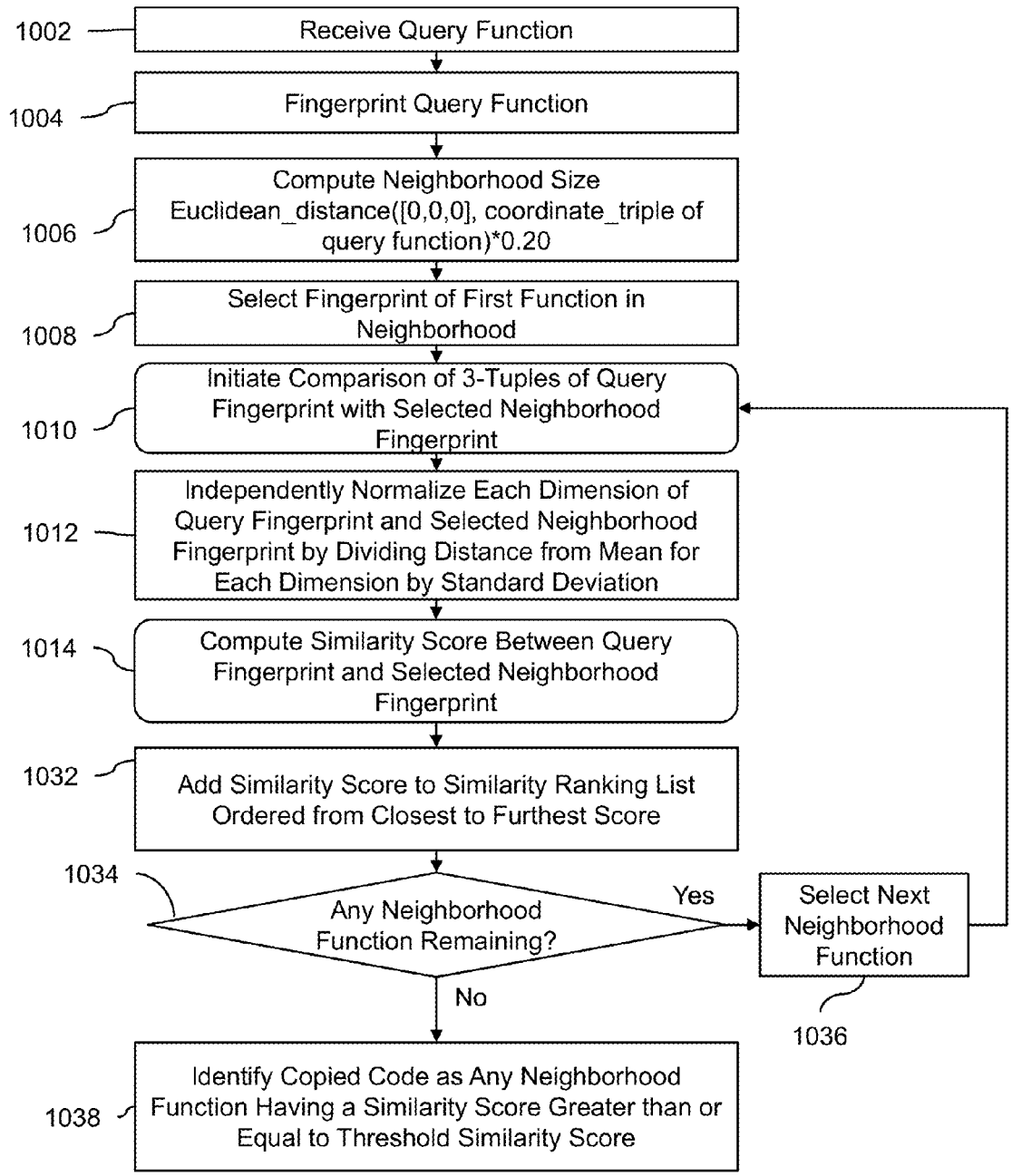
FIGS. 10A and 10B are flow diagrams of an exemplary process for matching fingerprints in accordance with another embodiment of the present invention.
Figure 10B:
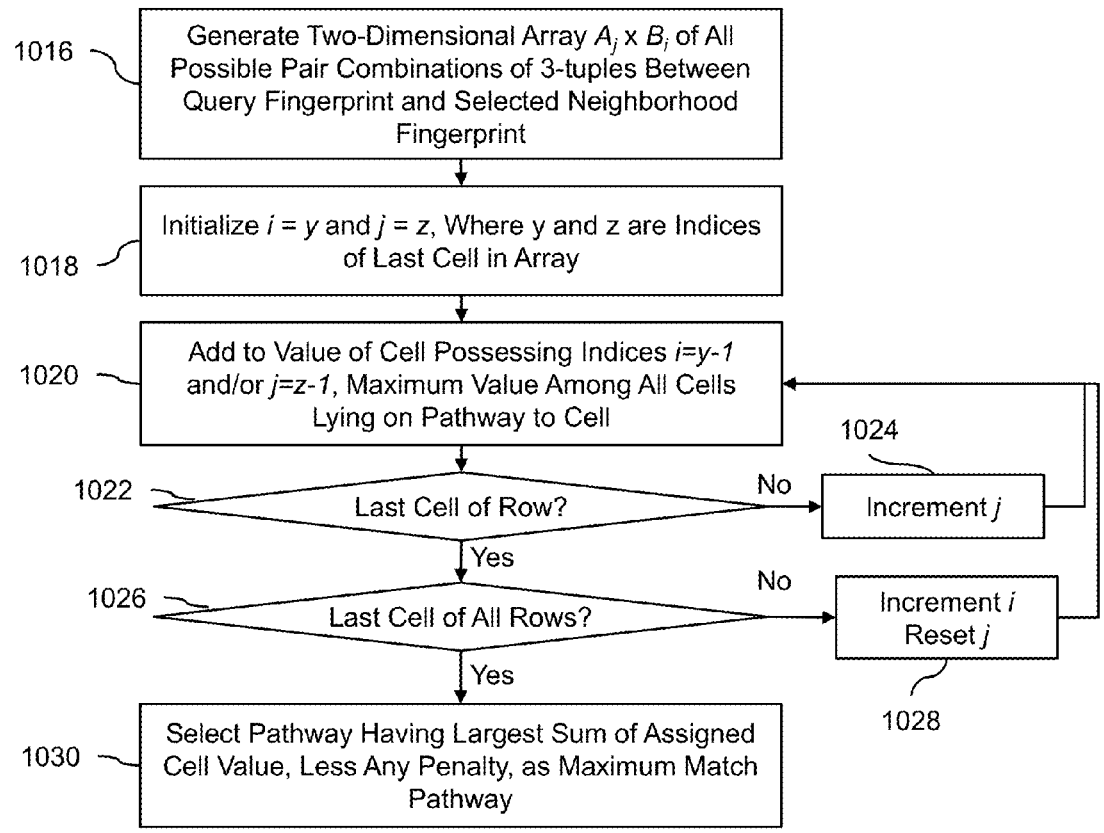

FIGS. 10A and 10B are a flow diagrams of an exemplary process 1000 for matching fingerprints in accordance with another embodiment of the present invention, which is performed using the system of FIG. 2. Because the database of fingerprinted functions is generated using disassembled complied binaries the fingerprinted functions may contain one or more blocks that are added by the complier during compilation of the source code. Accordingly, a function may have been copied from another function even though two functions are not identical, i.e., there may not be an exact correspondence between the blocks and/or paths of one function and those of another function. These types of discrepancies are addressed in the method of FIGS. 10A and 10B, and thus the fingerprint matching of the present invention can identify functions containing copied code even when the functions are not identical.

Accordingly, when one desires to determine whether a function has been copied, processor 205 receives the function as a query function (step 1002) and fingerprints it (step 1004) using the method detailed above in connection with FIG. 8. Next processor 205 determines a neighborhood size for identifying potentially copied functions (step 1006) using the following formula:

Neighborhood_Size=Eclidean_distance([0,0,0], coordinate_triple_of_query_function)*0.20.

where coordinate_triple_of_query_function comprises the (1) control flow graph block count, (2) control flow graph edge count, and (3) function call count of the query function.

The value 0.20 is a weighting factor controlling the size of the neighborhood, which in this instance is a 20% weighting factor. It should be recognized that other weighting factors could be employed, as well as no weighting factor, depending upon the query function. The weighting factor adjustment depends on the density of the distribution of the measurements of the function features, specifically, how many other functions within the call graph have similar feature metrics necessitating an expansion or contraction of the definition of a function's neighborhood.

Now that the search neighborhood has been defined, processor 205 can search a database of fingerprints, which can be stored in memory 210, to identify those within the search neighborhood and then select the fingerprint of a first function in the neighborhood (step 1008). Processor then initiates a comparison of the selected neighborhood fingerprint corresponding 3-tuple to the 3-tuple of the fingerprint of the query function (step 1010). Processor 205 begins the comparison by independently normalizing each dimension of the query fingerprint and the selected neighborhood fingerprint by dividing the distance from the mean for each dimension of all fingerprints in the neighborhood by the standard deviation for each dimension of all fingerprints in the neighborhood (step 1012).

Processor 205 calculates a similarity score between the query fingerprint and the selected neighborhood fingerprint using the Needleman-Wunsch algorithm (step 1014), which is described in the article "A general method applicable to the search for similarities in the amino acid sequence of two proteins" S. Needleman et al., Journal of Molecular Biology 48 (3): 443-53. doi:10.1016/0022-2836(70)90057-4. PMID 5420325, the entire disclosure of which is herein expressly incorporated by reference.

The details of the application of the Needleman-Wunsch algorithm in the present invention are illustrated in FIG. 10B, which will be described in connection with FIGS. 11A-11C. First, processor 205 generates a two-dimensional array $A_j \times B_i$ of all possible pair combinations of 3-tuples between the query fingerprint and the selected neighborhood fingerprint (step 1016), where, starting from the beginning of the ordered list of 3-tuples, $A_j$ represents jth block in the ordered list for the selected neighborhood function the and $B_i$ represents the ith block in the ordered list for the query function. The assignment of the neighborhood function to $A_j$, and the query function to $B_i$ is not critical and the assignments can be reversed. Each cell of the array is assigned a value of "1" if there is a match between the 3-tuples for the query fingerprint and the selected neighborhood fingerprint and a "0" if there is no match. The array allows a representation of every possible comparison between the blocks of the two fingerprints by generating pathways through the array and the pathway having the sum of assigned cell values that is the largest is selected as the similarity score.

Next, processor 205 initializes the indices i and j to correspond to the last cell in the array (step 1018), which in this example is setting i=y and j=z. Processor 205 then performs a successive summation procedure according to steps 1020-1028, in a row-by-row manner starting from the right side of each row. Specifically, for a cell under evaluation at i=y and j=z, processor 205 adds its value to the maximum value of the cells having indices u=y-1 and/or j=z-1 (step 1020). For example, referring now to FIGS. 11A and 11B, assume that the highlighted cell at indices 4, 4 is under evaluation and that it was already assigned a value of 1 due to a match between 3-tuples of the query fingerprint and the selected neighborhood fingerprint. In FIG. 11A the cells in row 4 to the right of the cell at indices 4, 4 have already been subject to the successive summation, as well as all of the cells in rows 1-3. The cells having an index of 3 (i.e., 4-1) are evaluated to identify the maximum value, which in this example would be the value of 2 in the cell at 3, 3. Accordingly, as illustrated in FIG. 11B, the value of 2 is added to the value of 1 already at cell 4, 4, and thus the successive summation results in a value of 3 at index 4, 4.

Returning to FIG. 10B, after adding the value to a cell, processor 205 determines whether the evaluated cell is the last cell in a row (step 1022). If not ("No" path out of decision step 1022), processor 205 increments the column index by one (step 1024) and the next cell in the row is subjected to the successive summation (step 1020). If processor 205 determines that the evaluated cell is the last cell of the row ("Yes" path out of decision step 1022), then processor 205 determines whether the evaluated cell is the last cell of all of the rows (step 1026). If processor 205 determines there are remaining rows ("No" path of decision step 1026), then processor 205 increments the row index by one and resets the column index to the most right-hand column index (step 1028) and processor 205 continues the successive summation in the first column of the next row (step 1020). The result of the successive summation across all cells is illustrated in FIG. 11C.

If processor 205 determines that all cells have been evaluated ("Yes" path out of decision step 1026), then processor 205 selects, based on the Manhattan distance between each of the 3-tuples, a pathway having the largest sum of the assigned cell values, less any gap penalty, as the maximum match pathway (step 1030). In an exemplary embodiment the gap penalty is 3. However, it will be recognized that other gap penalties can be used. The value in each cell in the outer row or outer column contains a value of the maximum number of matches that can be obtained by starting a pathway at that cell, and the cell in the outer row and column are evaluated identify the cell having the largest value, which is where the maximum match pathway begins. The maximum match pathway then continues from this outer cell to the cell in each successive row or column having a largest value. Referring again to FIG. 11C, the largest number in the outer row or column is at index 6, 6, which has a value of 4. From index 6, 6 the pathway continues to the cell having the maximum value in each row of each successive column, which is illustrated by the arrows in the figure.

Returning to FIG. 10A, once processor 205 identifies the maximum match pathway (step 1030), then processor 205 uses the sum of all of the cells along the pathway as the similarity score, which is added to a similarity score ranking list, which is ordered by score from closest to further (step 1034). If processor 205 determines there are functions in the neighborhood that have not yet been compared ("Yes" path out of decision step 1034), then processor 205 selects the next neighborhood function (step 1036) and subjects it to the comparison (step 1010). If processor 205 determines that all neighborhood functions have been subject to the comparison ("No" path out of decision step 1034), then processor 205 identifies any function having a similarity score greater than or equal to a threshold similarity score as being a function having code copied by the query function (step 1038). The threshold can be set, for example, by training the system using known data and a particular compiled computer binary for which it is to be determined whether there are other compiled computer binaries infringing the particular compiled computer binary. This training identifies commonalities between the known data and the particular compiled computer binary so that the threshold can be set to avoid false positives indicating infringement due to code commonly used across different pieces of software that would not be an indicator of infringement.

Although FIGS. 10A and 10B involve a comparison between the query function and a plurality of functions stored in a database of fingerprints, the comparison technique can also be employed to compare two functions to identify whether one contains copied code of the other. In this case the selection of the neighborhood size (step 1006) could be eliminated along with the iteration through the functions in the neighborhood (the return path from step 1036 to 1010). Alternatively, the neighborhood size (step 1006) could be maintained as an initial threshold to quickly eliminate the possibility of copying when one of the fingerprints is outside of the neighborhood. In this case the iteration through functions in the neighborhood would still be eliminated because the comparison involves only two functions.

The fingerprint generation and matching techniques of the present invention advantageously improve the operation of the computer performing these techniques by reducing the processing load required to fingerprint code and compare fingerprints.

Although exemplary embodiments have been described above as generating fingerprints using compiled computer binaries, the present invention is equally applicable to computer source code, byte code, and the like.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method comprising:
   receiving, by a computer, a first compiled computer binary;
   generating, by the computer, a first fingerprint of a first function of the first compiled computer binary by
      generating a block rank score for each block in the first function;
      generating a path of blocks of the first function based on the block rank score of each block;
      generating the first fingerprint using the generated path of blocks of the first function;
   receiving, by the computer, a second compiled computer binary;
   generating, by the computer, a second fingerprint of a second function of the second compiled computer binary by
      generating a block rank score for each block in the second function;
      generating a path of blocks of the second function based on the block rank score of each block;
      generating the second fingerprint using the generated path of blocks of the second function;
   comparing, by the computer, the first fingerprint of the first function with the second fingerprint of the second function; and
   determining, by the computer, whether the second function includes at least some of code from the first function based on the comparison, wherein the generation of a block rank score for each block in the first and second functions involves reversing all edges in a control flow graph for the first and second functions and assigning a block rank score to each block based on block rank scores of blocks having a forward path to the each block.

2. The method of claim 1, wherein the generation of the path of blocks for the first and second functions comprises:
   starting from a first block in the first and second functions;
   selecting a next block in the path based on the block rank score of possible next blocks; and
   storing, for each block in an ordered list based on a position within the path, a 3-tuple comprising a number of instructions in the block, an in-degree of the block, and an out-degree of the block.

3. The method of claim 2, wherein the path of blocks of the first function includes less than all blocks of the first function and the ordered list for the first function only includes 3-tuples for blocks in the path of blocks for the first function.

4. The method of claim 1, wherein the first and second complied computer binaries are complied using different compilers, one of the different compilers adds at least one block to the first or second function that is not present in the other of the first and second functions, and a match is determined between the first and second functions even though the added at least one block is not present in both the first and second functions.

5. The method of claim 1, wherein the comparison of the first and second fingerprints involves comparing 3-tuples in a first ordered list for the first function with 3-tuples in a second ordered list for the second function, wherein the 3-tuples in the first and second ordered lists comprise a number of instructions in the block, an in-degree of the block, and an out-degree of the block.

6. The method of claim 5, wherein the comparison of the 3-tuples in the first and second ordered lists comprises:
   generating a two-dimensional array of all possible pair combinations between the 3-tuples in the first and second ordered lists;
   generating a maximum match pathway through the two-dimensional array.

7. The method of claim 1, wherein a plurality of functions are generated from a plurality of received complied computer binaries, and each of the plurality of functions is fingerprinted and compared to one of the first and second fingerprints to determine whether each of the plurality of functions matches the one of the first and second fingerprints.

8. A method comprising:
   receiving, by a computer, a plurality of complied computer binaries;
   generating, by the computer, a plurality of fingerprints for a corresponding plurality of functions in each of the plurality of compiled computer binaries;
   storing, by the computer, the plurality of fingerprints in a database;
   receiving, by the computer, a query function;
   generating, by the computer, a query fingerprint for the query function by
      generating a block rank score for each block in the query function, wherein the generation of a block rank score for each block in the query function involves reversing all edges in a control flow graph for the query function and assigning a block rank score to each block based on block rank scores of blocks having a forward path to the each block;
      generating a path of blocks of the query function based on the block rank score of each block;
      generating the query fingerprint using the generated path of blocks of the query function;
   comparing, by the computer, the query fingerprint to each of the plurality of fingerprints; and
   determining, by the computer, that the query fingerprint contains copied code from one of the plurality of fingerprints based on the comparison.

9. The method of claim 8, wherein the generation of the path of blocks for the query function comprises:
 starting from a first block in the query function;
 selecting a next block in the path based on the block rank score of possible next blocks; and
 storing, for each block in an ordered list based on a position within the path, a 3-tuple comprising a number of instructions in the block, an in-degree of the block, and an out-degree of the block.

10. The method of claim 9, wherein the path of blocks of the query function includes less than all blocks of the query function and the ordered list for the query function only includes 3-tuples for blocks in the path of blocks for the query function.

11. The method of claim 8, wherein the comparison of the query fingerprint with the plurality of fingerprints involves comparing 3-tuples in a first ordered list for the query function with 3-tuples in ordered lists for each of the plurality of functions, wherein the 3-tuples in the first ordered list and in the ordered lists for each of the plurality of functions comprise a number of instructions in the block, an in-degree of the block, and an out-degree of the block.

12. The method of claim 11, wherein the comparison of the 3-tuples in the first and second ordered lists comprises:
 generating a two-dimensional array of all possible pair combinations between the 3-tuples in the first and second ordered lists;
 generating a maximum match pathway through the two-dimensional array.

13. A method comprising:
 receiving, by a computer, a first compiled computer binary;
 generating, by the computer, a first fingerprint of a first function of the first compiled computer binary by
 generating a block rank score for each block in the first function, wherein the generation of a block rank score for each block in the first function involves reversing all edges in a control flow graph for the first function and assigning a block rank score to each block based on block rank scores of blocks having a forward path to the each block;
 generating a path of blocks of the first function based on the block rank score of each block; and
 generating the first fingerprint using the generated path of blocks of the first function;
 comparing, by the computer, the first fingerprint of the first function with a second fingerprint of a second function by
 comparing 3-tuples in a first ordered list for the first function with 3-tuples in a second ordered list for the second function by
 generating a two-dimensional array of all possible pair combinations between the 3-tuples in the first and second ordered lists;
 generating a maximum match pathway through the two-dimensional array, wherein the 3-tuples in the first and second ordered lists comprise a number of instructions in the block, an in-degree of the block, and an out-degree of the block; and
 determining, by the computer, whether the second function includes at least some of code from the first function based on the comparison.

14. The method of claim 13, wherein the generation of the path of blocks for the first function comprises:
 starting from a first block in the first function;
 selecting a next block in the path based on the block rank score of possible next blocks; and
 storing, for each block, a 3-tuple for the block in an ordered list based on a position of the block within the path.

15. The method of claim 14, wherein the path of blocks for the first function includes less than all blocks of the first function and the ordered list for the query function only includes 3-tuples for blocks in the path of blocks for the query function.

* * * * *